United States Patent
Issari et al.

(10) Patent No.: US 12,049,531 B2
(45) Date of Patent: Jul. 30, 2024

(54) CURABLE COMPOSITIONS FOR PRODUCTION OF REACTION INDUCED PHASE SEPARATED COMPOSITIONS WITH IMPROVED PROPERTIES

(71) Applicant: Henkel AG & Co. KGaA, Duesseldorf (DE)

(72) Inventors: Bahram Issari, Glastonbury, CT (US); Michael Paul Levandoski, Terryville, CT (US); Christina Despotopoulou, Minneapolis, MN (US); Tianzhi Zhang, Skillman, NJ (US); Darel Gustafson, Shelton, CT (US); Robert P. Cross, Rocky Hill, CT (US)

(73) Assignee: Henkel AG & Co. KGaA, Duesseldorf (DE)

( * ) Notice: Subject to any disclaimer, the term of this patent is extended or adjusted under 35 U.S.C. 154(b) by 536 days.

(21) Appl. No.: 17/370,294

(22) Filed: Jul. 8, 2021

(65) Prior Publication Data
US 2021/0332176 A1    Oct. 28, 2021

Related U.S. Application Data

(63) Continuation of application No. PCT/US2020/013492, filed on Jan. 14, 2020.
(Continued)

(51) Int. Cl.
*C08F 290/06* (2006.01)
*C08F 120/32* (2006.01)
(Continued)

(52) U.S. Cl.
CPC ........ *C08F 290/068* (2013.01); *C08F 120/32* (2013.01); *C08G 77/16* (2013.01); *C08G 77/20* (2013.01); *C08G 77/38* (2013.01)

(58) Field of Classification Search
CPC ..... C09D 11/101; C09D 11/102; B28B 1/001; B29C 64/124; B33Y 10/00; B33Y 70/00;
(Continued)

(56) References Cited

U.S. PATENT DOCUMENTS 5,395,862 A   3/1995  Neckers et al.
5,545,676 A   8/1996  Palazzotto et al.
(Continued)

FOREIGN PATENT DOCUMENTS

CN   102321222 B   4/2015
EP     0369645 A1   5/1990
(Continued)

OTHER PUBLICATIONS

Mazurek et al. Novel Materials Based on Silicone-Acrylate Copolymer Networks. Journal of Applied Polymer Science. vol. 80, 159-160 (2001). (Year: 2001).*
(Continued)

*Primary Examiner* — Sanza L. McClendon
(74) *Attorney, Agent, or Firm* — James E. Piotrowski

(57) ABSTRACT

Curable compositions that undergo reaction induced phase separation of domains in cured matrix and provide beneficial physical and chemical properties and methods of use of such compositions. Curable compositions that undergo reaction induced phase separation of domains in cured matrix in response to a first set of curing conditions and the domains undergo a second reaction in response to a second set of curing conditions to improve the physical properties of the domains and the cured composition, such as improvements in glass transition temperature and thermal degradation.

18 Claims, 11 Drawing Sheets

Related U.S. Application Data

(60) Provisional application No. 62/793,040, filed on Jan. 16, 2019.

(51) Int. Cl.
*C08G 77/16* (2006.01)
*C08G 77/20* (2006.01)
*C08G 77/38* (2006.01)

(58) Field of Classification Search
CPC ...... C01B 32/977; C08G 77/20; C08G 77/60; B29K 2083/00; C08K 5/07; C08L 83/16
USPC .......................................... 522/148, 99, 172
See application file for complete search history.

(56) References Cited

U.S. PATENT DOCUMENTS

| | | | | |
|---|---|---|---|---|
| 6,592,998 B2 * | 7/2003 | Anderson | ............... | C08L 33/08 528/25 |
| 6,627,672 B1 | 9/2003 | Lin et al. | | |
| 6,838,490 B2 * | 1/2005 | Zhang | ........................ | C08J 3/28 524/588 |
| 7,473,367 B2 * | 1/2009 | Xie | ........................ | B01J 39/26 210/656 |
| 7,763,693 B2 * | 7/2010 | Nagoh | .................. | C08F 283/12 522/170 |
| 8,124,689 B2 * | 2/2012 | Loubert | ................ | C08F 290/14 525/477 |
| 8,133,644 B2 * | 3/2012 | Mazurek | ............... | G03F 7/2022 430/290 |
| 8,227,048 B2 * | 7/2012 | Leyden | ................... | G03F 7/038 522/170 |
| 8,535,473 B2 * | 9/2013 | Dietz | ........................ | C09J 7/35 156/275.5 |
| 8,569,416 B2 * | 10/2013 | Evans | .................... | A61K 31/56 528/25 |
| 8,614,278 B2 * | 12/2013 | Loubert | .................. | A61P 11/02 424/443 |
| 8,637,226 B2 * | 1/2014 | Mazurek | ................. | G03F 7/028 430/394 |

| | | | |
|---|---|---|---|
| 2005/0022929 A1 | 2/2005 | Schoenfeld et al. | |
| 2008/0064815 A1 | 3/2008 | Issari et al. | |
| 2011/0210454 A1 | 9/2011 | Xiao et al. | |
| 2015/0133597 A1 | 5/2015 | Eger et al. | |
| 2017/0279013 A1 | 9/2017 | Vo et al. | |

FOREIGN PATENT DOCUMENTS

| | | | | |
|---|---|---|---|---|
| EP | 0563925 A1 | 10/1993 | | |
| EP | 1586615 A1 | 10/2005 | | |
| EP | 2599847 A1 * | 6/2013 | ........... | A61K 31/192 |
| JP | 2017179083 A * | 10/2017 | | |
| KR | 2017115582 A * | 10/2017 | ........... | A61K 31/167 |

OTHER PUBLICATIONS

Mazurek et al., Novel Materials Based on Silicone-Acrylate Copolymer Networks, Journal of Applied Polymer Science, 2001, vol. 80, pp. 159-180.

Sangermano et al., Developments of Organic-Inorganic Hybrid Free Radical-Cationic Dual Cured Coatings, Polymer Bulletin Germany, 2008, 59(6), pp. 865-872.

Crivello, Hybrid acrylate-oxetane photopolymerizable systems, Journal of Polymer Science, Part A: Polymer Chemistry, 2015, vol. 53, 4, pp. 594-601.

Williams et al., Kinetics of free-radical polymerization of IBOMA in the presence of Polyisobutylene of different molar masses, Macromolecules, 2005.

Choi et al., Highly transparent polymer substrates for flexible displays using semi-interconnected interpenetrating polymer networks, Journal of nanoscience and nanotechnology, 2010.

Winnik et al., Polyurethane-polyacrylate IPN-preparation and morphology, Macromolecules, 1996.

Wouters et al., Morphological transition during the thermal deprotection of polyIBOA—polyethoxyethylacrylate, Soft Matter, 2007.

Olmos et al., Cure process and reaction-induced phase separation in a diepoxy-diamine/PMMA blend. Monitoring by steady-state fluorescence and FT-IR (near and medium range), Colloid and Polymer Science, 2006 vol. 284, pp. 654-667.

International Search Report for International PCT Patent Application No. PCT/US2020/013492 dated May 8, 2020.

* cited by examiner

CURABLE COMPOSITIONS FOR PRODUCTION OF REACTION INDUCED PHASE SEPARATED COMPOSITIONS WITH IMPROVED PROPERTIES

FIELD

The present invention relates to curable compositions that undergo reaction induced phase separation of domains in cured matrix and provide beneficial physical and chemical properties and methods of use of such compositions. More particularly, the present invention relates to curable compositions that undergo reaction induced phase separation of domains in cured matrix in response to a first set of curing conditions and the domains undergo a second reaction in response to a second set of curing conditions to improve the physical properties of the domains and the cured composition, such as improvements in glass transition temperature and thermal degradation.

BRIEF DESCRIPTION RELATED TECHNOLOGY

Reaction induced phase separation (RIPS) reactions are well known. More specifically, RIPS that lead to domain formation within a continuous matrix are also known. Many liquid optically clear adhesive (LOCA) products are based on this technology including 3D printing products.

Generally, in reaction induced phase separation reactions a domain forming composition is dissolved in a continuous matrix forming composition. Both domain forming composition and the continuous matrix forming composition include polymerizable moieties that cure under similar conditions. This combination of the domain forming composition and the continuous matrix forming composition is subjected to conditions that promote polymerization. While the continuous matrix forming composition begins to cure into a continuous matrix, the domain forming composition simultaneously begins to agglomerate into domains and cure. When fully cured the final product is a cured matrix containing cured domains.

The domains resulting from the phase separation provide for a toughening of the cured matrix, such as increase in tensile strength and elongation at break, as compared to a polymer of the cured matrix alone. However, the phase separated domains are organic and exhibit the associated glass transition temperatures ($T_g$) and decomposition temperatures. Accordingly, the domains are susceptible to the impact of temperature and warming to the $T_g$ of the organic domain, and elevated temperature can greatly diminish the toughening contribution provided by the domains.

There is a need for a RIPS composition with domains that has higher softening temperatures and thermal decomposition temperatures to maintain the toughening of the cured matrix at elevated temperatures.

SUMMARY

The present invention provides a means of satisfying the above-mentioned need. The present invention provides curable compositions that undergo reaction induced phase separation of domains in cured matrix and provide beneficial physical and chemical properties and methods of use of such compositions. More particularly, the present invention provides curable compositions that undergo reaction induced phase separation of domains in cured matrix in response to a first set of curing conditions and the domains undergo a second reaction (e.g., further cross-linking) in response to a second set of curing conditions to improve the physical properties of the domains and the cured composition, such as improvements in glass transition temperature and thermal degradation. The improved physical properties of the domains leads to improvements in the physical properties of the cured composition, such as increased resistance to softening at elevated temperatures and modified shape memory properties. Preferably, the second set of curing conditions comprises a different cure mechanism than the first set of curing conditions.

In an aspect of the invention there is provided a curable composition including an admixture of: a) a continuous matrix forming component including at least two acrylate moieties and having a molecular weight of about 500 daltons or greater, b) a domain forming component having the following formula:

MA-R—Z wherein MA is a (meth)acrylate, R is a $C_{1-8}$ alkylene, and Z is an oxirane group or an oxetane group, and c) a domain forming co-component; wherein the curable composition is capable of reaction induced phase separation to produce of domains of a polymer of the domain forming component within a continuous matrix of a polymer of the continuous matrix forming component upon exposure to a first set of curing conditions that promotes curing of the acrylate moieties.

In another aspect of the invention there is provided a method of producing a dual-phase, cured composition including the steps of: a) providing a curable composition including an admixture of: i) a continuous matrix forming component having at least two acrylate moieties and having a molecular weight of about 500 daltons or greater, ii) a domain forming component having the following formula:

MA-R—Z wherein MA is a (meth)acrylate, R is a $C_{1-8}$ alkylene, and Z is an oxirane group or an oxetane group; b) exposing the curable composition to a first set of curing conditions to induce reaction induced phase separation to produce an intermediate cured composition having domains of a polymer of the domain forming component within a continuous matrix of a polymer of the continuous matrix forming component, c) exposing the intermediate cured composition to a second set of curing conditions to induce additional curing of the domains of the polymer of the domain forming component to obtain a dual-phase, cured composition.

In a further aspect of the invention there is provided a dual-phase, cured composition produced by a method including the steps of: a) providing a curable composition including an admixture of: i) a continuous matrix forming component having at least two acrylate moieties and having a molecular weight of about 500 daltons or greater, ii) a domain forming component having the following formula:

MA-R—Z wherein MA is a (meth)acrylate, R is a $C_{1-8}$ alkylene, and Z is an oxirane group or an oxetane group, and iii) a domain forming co-component; b) exposing the curable composition to a first set of curing conditions to induce reaction induced phase separation to produce an intermediate cured composition having domains of a polymer of the domain forming component within a continuous matrix of a polymer of the continuous matrix forming component, c) exposing the intermediate cured composition to a second set of curing conditions to induce additional curing of the domains of the polymer of the domain forming component to obtain a dual-phase, cured composition.

In yet other aspect of the invention there is provided a curable, dual-phase composition including a continuous matrix of a first polymer containing domains including: a) a second polymer, wherein the second polymer comprises oxirane groups or oxetane groups in an amount sufficient to allow for further curing of the domains and b) a domain curing co-component.

DETAILED DESCRIPTION

Figure 1:
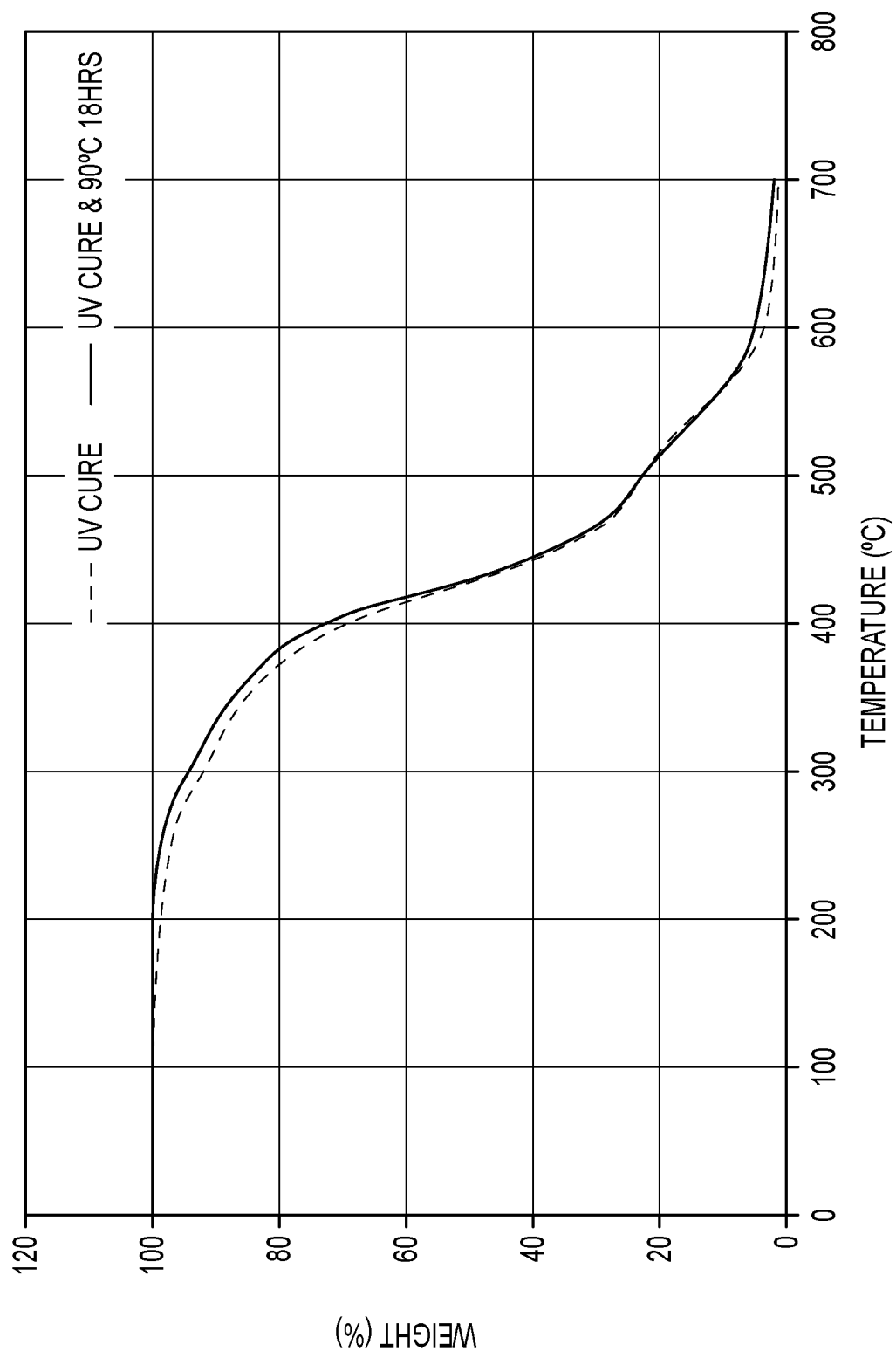
FIG. 1 shows thermogravimetric analysis curve for Formulation F.

The present invention is directed to compositions that undergo reaction induced phase separation of domains in cured matrices and provide beneficial physical and chemical properties and methods of use of such compositions. More particularly, the present invention is directed to dual-phase compositions that undergo reaction induced phase separation of domains in cured matrices and a second curing reaction (e.g., further cross-linking) of the domains to improve the physical properties of the domains, such as glass transition temperature and thermal degradation. The improved physical properties of the domains leads to improvements in the physical properties of the cured composition, such as increased resistance to softening at elevated temperatures and modified shape memory properties.

In an aspect of the invention there is provided a curable composition including an admixture of: a) a continuous matrix forming component including at least two acrylate moieties and having a molecular weight of about 500 daltons or greater, b) a domain forming component having the following formula:

MA-R—Z wherein MA is a (meth)acrylate, R is a $C_{1-8}$ alkylene, and Z is an oxirane group or an oxetane group, and c) a domain forming co-component; wherein the curable composition is capable of reaction induced phase separation to produce domains of a polymer of the domain forming component within a continuous matrix of a polymer of the continuous matrix forming component upon exposure to a first set of curing conditions that promotes curing of the acrylate moieties.

As used herein, the "continuous matrix forming component containing (or comprising) at least two acrylate moieties" is a oligomer or polymer including at least two acrylate moieties capable of being cured into a continuous matrix upon exposure to the appropriate conditions. In an aspect of the present invention, the continuous matrix forming component is a silicone, a polyacrylate, a polyisobutylene, a polyether, a hydrogenated polybutadiene, a polyester, or a combination thereof with at least two acrylate moieties. In a further aspect of the present invention, the continuous matrix forming component including at least two acrylate moieties is a telechelic (meth)acrylate terminated polydimethyl siloxane or a diemethoxy diacrylate terminated polydimethyl siloxane. In another aspect of the present invention, the continuous matrix forming component including at least two acrylate moieties has a molecular weight of about 500 daltons or greater.

In other aspects of the present invention, the continuous matrix forming component including at least two acrylate moieties has a molecular weight between about 500 daltons and about 1 million daltons, between about 1,000 daltons and about 500,000 daltons, between about 2,500 daltons and about 250,000 daltons, or between about 5,000 daltons and about 100,000 daltons.

In an aspect of the present invention, the continuous matrix forming component including at least two acrylate moieties is present in an amount between about 40% to about 95% by weight based on the total weight of the curable composition. In aspects of the present invention, the continuous matrix forming component including at least two acrylate moieties is present in an amount between about 50% to about 80% by weight based on the total weight of the curable composition, between about 55% to about 75% by weight based on the total weight of the curable composition, or between about 60% to about 70% by weight based on the total weight of the curable composition.

In the present invention, the domain forming component has the following formula:

MA-R—Z wherein MA is a (meth)acrylate, R is a $C_{1-8}$ alkylene, and Z is an oxirane group or an oxetane group that is capable of being cured into domains within the continuous matrix upon exposure to the appropriate conditions.

As used herein, the term "(meth)acrylate" means acrylate and methacrylate. As used herein, "acrylate" means the univalent —O—C(O)—C=C moiety. As used herein "methacrylate" means the univalent —O—C(O)—C(CH$_3$)=C moiety. Illustrative examples of useful mono-functional (meth)acrylates, include alkyl (meth)acrylates, cycloalkyl (meth)acrylates, alkenyl (meth) acrylates, heterocycloalkyl (meth) acrylates, heteroalkyl methacrylates, alkoxy polyether mono(meth)acrylates.

The alkyl group on the (meth)acrylate desirably may be a substituted or unsubstituted alkyl group having 1 to 20 carbon atoms, desirably 1 to 10 carbon atoms, optionally having at least one substituent selected from an alkyl group having 1 to 10 carbon atoms, substituted or unsubstituted cycloalkyl group having 1 to 20 carbon atoms, desirably 1 to 10 carbon atoms, substituted or unsubstituted bicyclo or tricycloalkyl group having 1 to 20 carbon atoms, desirably 1 to 15 carbon atoms, an alkoxy group having 1 to 10 carbon atoms, an aryloxy group having 6 to 10 carbon atoms.

The alkenyl group on the (meth)acrylate desirably may be a substituted or unsubstituted alkenyl group having 2 to 20 carbon atoms, desirably 2 to 10 carbon atoms, optionally having at least one substituent selected from an alkyl group having 1 to 10 carbon atoms, an alkene group having 2 to 10 carbon atoms, an alkoxy group having 1 to 10 carbon atoms, an aryloxy group having 6 to 10 carbon atoms, an epoxy group having 2 to 10 carbon atoms, hydroxyl and the like.

The heterocyclo group on the (meth)acrylate desirably may be a substituted or unsubstituted heterocyclo group having 2 to 20 carbon atoms, desirably 2 to 10 carbon atoms, containing at least one hetero atom selected from N and O, and optionally having at least one substituent selected from an alkyl group having 1 to 10 carbon atoms, an alkoxy group having 1 to 10 carbon atoms, an aryloxy group having 6 to 10 carbon atoms, or an epoxy group having 2 to 10 carbon atoms.

The alkoxy polyether mono(meth)acrylates can be substituted with an alkoxy group having 1 to 10 carbons and the polyether can have 1 to 10 repeat units.

Some exemplary mono-functional (meth)acrylates include, but are not limited to, methyl (meth)acrylate, ethyl (meth) acrylate, butyl (meth) acrylate, tetrahydrofuryl (meth)acrylate, lauryl acrylate, isooctyl acrylate, isodecyl acrylate, 2-ethylhexyl acrylate, isobornyl (meth)acrylate, dicyclopentenyl (meth)acrylate, octadecyl acrylate, 2-hydroxyethyl (meth)acrylate, 2-hydroxypropyl (meth)acrylate, 2-hydroxybutyl (meth)acrylate, 2-(2-ethoxyethoxy)ethyl acrylate, 2-phenoxyethyl acrylate, dicyclopentadienyl (meth)acrylate, dicyclopentenyloxyethyl (meth) acrylate, morpholine (meth)acrylate, isobornyl (meth)acrylate, N,N, dialkyl acrylamide, 2-methoxyethyl (meth)acrylate, 2(2-ethoxy)ethoxy ethyl acrylate and caprolactone acrylate.

As used herein, a "oxirane group" is an cyclic ethylene oxide group (i.e., an epoxide) having the formula

As used herein, a "oxetane group" is a 4-membered cyclic ether group (e.g., 1,3-propylene oxide) having the formula

In an aspect of the present invention, the domain forming component is glycidyl methacrylate, which has the formula:

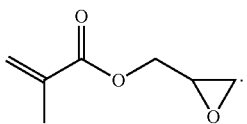

In another aspect of the present invention, the domain forming component is a liquid. In a further aspect of the present invention, the domain forming component has a viscosity of about 1,000 cps or lower, preferably, about 100 cps or lower.

In an aspect of the present invention, the domain forming component is present in an amount between about 5% to about 60% by weight based on the total weight of the curable composition. In aspects of the present invention, the domain forming component is present in an amount between about 10% to about 55% by weight based on the total weight of the curable composition, between about 15% to about 50% by weight based on the total weight of the curable composition, or between about 25% to about 45% by weight based on the total weight of the curable composition.

As the amount of the domain forming component in the curable composition increases the average diameter of the domains increases. In an aspect of the present invention, the domains formed in the continuous matrix have an average diameter between about 10 nanometers and about 100 nanometers, between about 15 nanometers and about 75 nanometers, or about 20 nanometers and about 50 nanometers. If the size of the domains is too great they will interfere with light penetration through the cured composition. Moreover, increases in the amount of domain forming component will produce more plastic properties for the cured composition as the domains approach becoming the continuous phase.

A used herein, the "domain forming co-component" or "domain curing co-component" means a compound, composition, or catalyst that separates into the domains with the domain forming component and aids or promotes the additional or secondary curing of the domains via the oxiranes group or the oxetane groups. In aspects of the invention, the domain forming co-component is an organic acid, an organic primary amine, an organic secondary amine, an amide, an imidazole, a mercaptan, a sulfide, or a combination thereof. In another aspect of the present invention, the domain forming co-component is a carboxylic acid. In an further aspect of the present invention, the domain forming co-component is acrylic acid.

In an aspect of the present invention, the ratio of the domain forming co-component and the domain forming component is from about 1:99 to about 1:1. In aspects of the present invention, the ratio of the domain forming co-component and the domain forming component is from about 1:75 to about 1:1, from about 1:50 to about 1:1, from about 1:25 to about 1:1, from about 1:10 to about 1:1, from about 1:5 to about 1:1, or from about 1:2 to about 1:1.

In an aspect of the present invention, the curable composition may also include domain forming monomer which is free of any oxirane groups and oxetane groups, such as (meth)acrylate monomers. Domain forming (meth)acrylate monomers are known in the art and include for example, isobornyl acrylate. In an aspect of the present invention, the domain forming monomer which is free of any oxirane groups and oxetane groups is present in an amount from about 1% to about 50% by weight based on the total weight of the curable composition.

In another aspect of the invention there is provided a method of producing a dual-phase, cured composition including the steps of: a) providing a curable composition including an admixture of: i) a continuous matrix forming component having at least two acrylate moieties and having a molecular weight of about 500 daltons or greater, ii) a domain forming component having the following formula:

wherein MA is a (meth)acrylate, R is a $C_{1-8}$ alkylene, and Z is an oxirane group or an oxetane group; b) exposing the curable composition to a first set of curing conditions to induce reaction induced phase separation to produce an intermediate cured composition having domains of a polymer of the domain forming component within a continuous matrix of a polymer of the continuous matrix forming component, c) exposing the intermediate cured composition to a second set of curing conditions to induce additional curing of the domains of the polymer of the domain forming component to obtain a dual-phase, cured composition.

In a further aspect of the invention there is provided a dual-phase, cured composition produced by a method including the steps of: a) providing a curable composition including an admixture of: i) a continuous matrix forming component having at least two acrylate moieties and having a molecular weight of about 500 daltons or greater, ii) a domain forming component having the following formula:

MA-R—Z wherein MA is a (meth)acrylate, R is a $C_{1-8}$ alyklene, and Z is an oxirane group or an oxetane group, and iii) a domain forming co-component; b) exposing the curable composition to a first set of curing conditions to induce reaction induced phase separation to produce an intermediate cured composition having domains of a polymer of the domain forming component within a continuous matrix of a polymer of the continuous matrix forming component, c) exposing the intermediate cured composition to a second set of curing conditions to induce additional curing of the domains of the polymer of the domain forming component to obtain a dual-phase, cured composition.

In an aspect of the present invention, the admixture of the continuous matrix forming component, the domain forming component, and domain forming co-component is a solution of the domain forming component, and domain forming co-component dissolved in the continuous matrix forming component. In this system the domain forming component can be considered a liquid filler. Essentially, when cured, the domains act as a filler in the cured composition to impart strength to the final composition, but prior to curing the low viscosity of the domain forming component lowers the viscosity of the curable composition. This allows for the optimization of viscosity and allows the curable composition to be spread and worked easily. Moreover, avoiding solid filler avoids imparting thixotropic properties to the curable composition. Such thixotropic properties are disadvantageous in many applications, such as 3D printing, where a Newtonian fluid is preferred for self-leveling. Moreover, liquid domain forming components also have the potential to improve adhesion of the curable composition to surfaces by interaction with surfaces and by lowering the resin viscosity.

In an aspect of the present invention, the "first set of curing conditions" are conditions that promote the curing of the acrylate moieties continuous matrix forming component and the domain forming component and result in reaction induced domain separation. In another aspect of the present invention, the continuous matrix forming component and the acrylate moiety of the domain forming component are radiation curable using radiation such as electron beam and/or photocurable or light curable, i.e., curable using light such as visible or ultraviolet light (UV). In aspects of the present invention, the curable composition may be cured using a light source, such as a mercury bulb or LED that produces visible or UV light.

In a further aspect of the present invention, the curable composition includes a first cure catalyst. As used herein, "first cure catalyst" means a composition or compound that initiates or promotes polymerization or curing of the acrylate moieties continuous matrix forming component and the domain forming component, and thus, reaction induced domain separation. In aspects of the present invention, the first cure catalyst is a photoinitiator. The photoinitiator may be a UV initiator, a visible initiator, or a combination of UV and visible initiators.

A variety of UV initiators may be employed. UV initiators are generally effective in the 200 to 400 nm range, and particularly in the portion of the spectrum that borders on the invisible light and the visible portion just beyond this, e.g. >200 nm to about 390 nm.

Initiators that will respond to UV radiation to initiate and induce curing of the (meth)acryl functionalized curable component, which are useful in the present invention include, but are not limited to, benzophenone and substituted benzophenones, acetophenone and substituted acetophenones, benzoin and its alkyl esters, xanthone and substituted xanthones, phosphine oxides, diethoxy-acetophenone, benzoin methyl ether, benzoin ethyl ether, benzoin isopropyl ether, diethoxyxanthone, chloro-thio-xanthone, N-methyl diethanol-amine-benzophenone, 2-hydroxy-2-methyl-1-phenyl-propan-1-one, 2-benzyl-2-(dimethylamino)-1-[4-(4-morpholinyl)phenyl]-1-butanone and mixtures thereof.

Examples of such UV initiators include initiators available commercially from IGM Resins under the "IRGACURE" and "DAROCUR" tradenames, specifically "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl) phosphine oxide and 2-hydroxy-2-methyl-1-phenyl-propan-1-one), and 819 [bis(2,4,6-trimethyl benzoyl)phenyl phosphine oxide], and "DAROCUR" 1173 (2-hydroxy-2-methyl-1-phenyl-1-propane) and 4265 (the combination of 2,4,6-trimethylbenzoyldiphenyl-phosphine oxide and 2-hydroxy-2-methyl-1-phenyl-propan-1-one); and 2,4,6-trimethylbenzoyldiphenylphosphine oxide (commercially available as LUCIRIN TPO from BASF Corp.). Of course, combinations of these materials may also be employed herein. Of course, it is understood that some of these photoinitiators categorized herein as UV photoinitiators have a tailing absorption into the visible range, and thus straddle the line between UV and visible light cure initiators, but nonetheless are included herein as part of the invention.

Initiators suitable for use in the present invention that will respond to visible light to initiate and induce curing include, but are not limited to, camphorquinone peroxyester initiators, 9-fluorene carboxylic acid peroxyesters, visible light [blue] photoinitiators, d1-camphorquinone, "IRGACURE" 784DC (photoinitiator based on substituted titanocenes), and combinations thereof.

Additional useful components are disclosed in the following document, which is incorporated herein by reference. European Patent Publication No. EP 0 369 645 A1 discloses a three-part photoinitiator system which includes a trihalomethyl substituted-s-triazine, a sensitizing compound capable of absorbing radiation in the range of about 300-1000 nm and an electron donor. Exemplary sensitizing compounds are disclosed, including: ketones; coumarin dyes; xanthene dyes; 3H-xanthen-3-one dyes; acridine dyes; thiazole dyes; thiazine dyes; oxazine dyes; azine dyes; aminoketone dyes; methane and polymethine dyes; porphyrins; aromatic polycyclic hydrocarbons; p-substituted aminostyryl ketone compounds; aminotriaryl methanes; merocyanines; squarylium dyes; and pyridinium dyes. Exemplary donors also are disclosed, including: amines; amides; ethers; ureas; ferrocene; sulfinic acids and their salts; salts of ferrocyanide; ascorbic acid and its salts; dithiocarbamic acid and its salts; salts of xanthates; salts of ethylene diamine tetraacetic acid; and salts of tetraphenylboronic acid. Such initiators are sensitive to both UV and visible light.

Additional useful components are disclosed in the following document, which is incorporated herein by reference. European Patent Publication No. EP 0 563 925 A1 discloses photopolymerization initiators including a sensitizing compound that is capable of absorbing radiation in the range of about 250-1000 nm and 2-aryl-4,6-bis(trichloromethyl)-1,3,5-triazine. Exemplary sensitizing compounds that are disclosed include: cyanine dye, merocyanine dye, coumarin dye, ketocoumarin dye, (thio)xanthene dye, acridine dye, thiazole dye, thiazine dye, oxazine dye, azine dye, aminoketone dye, squarylium dye, pyridinium dye, (thia)pyrylium dye, porphyrin dye, triaryl methane dye, (poly)methane dye, amino styryl compounds and aromatic polycyclic hydrocarbons. These photopolymerization initiators are sensitive to UV and visible light.

U.S. Pat. No. 5,395,862 to Neckers et al., which is incorporated by reference herein, discloses fluorone photoinitiators, which are sensitive to visible light. Such fluorone initiator systems also include a coinitiator, which is capable of accepting an electron from the excited fluorone species. Exemplary coinitiators are disclosed, including: onium salts, nitrohalomethanes and diazosulfones. U.S. Pat. No. 5,451,343 to Neckers et al., which is incorporated herein by reference, discloses fluorone and pyronin-Y derivatives as initiators that absorb light at wavelengths of greater than 350 nm. U.S. Pat. No. 5,545,676 to Palazzotto et al., which is incorporated by reference herein, discloses a three-part photoinitiator system, which cures under UV or visible light. The three-part system includes an arylidonium salt, a sensitizing compound and an electron donor. Exemplary iodonium salts include diphenyliodonium salts. Exemplary sensitizers and electron donors for use in the three-part system also are disclosed. Additionally, the sensitizer is capable of absorbing light in the range of about 300-1000 nm.

In an aspect of the invention, the first cure catalyst may be employed in amounts of about 0.05% to about 8% by weight of the total composition. In another aspect of the invention, the first cure catalyst is present in amounts of 0.1% to about 3% by weight of the total composition.

In an aspect of the present invention, the "second set of curing conditions" are conditions that promote the curing of the oxirane groups or oxetane groups of the polymer of the domain forming component in the intermediate curable composition and results in further reaction of the polymer of the domain forming component. Preferably, the cure mechanism and cure conditions for the second set of curing conditions are different from the cure mechanism and cure conditions for the first set of curing conditions. In another aspect of the present invention, the combination of the domain forming component and the domain forming co-component is curable via epoxy cure and the second set of curing conditions promotes the epoxy cure. In a further aspect of the present invention, the second set of curing conditions includes the application of heat to the intermediate cured composition.

In a further aspect of the present invention, the curable composition includes a second cure catalyst. As used herein, "second cure catalyst" means a composition or compound that initiates or promotes polymerization or curing of the oxirane groups and oxetane groups of the domain forming component, and thus, lead to further reaction (e.g., additional crosslinking) of the polymer of the domain forming component. In aspects of the present invention, the second cure catalyst is an acid-containing catalyst, such as carboxylic acid-containing, for example acrylic acid. In a further aspect of the present invention, the second cure catalyst is an amine-containing catalyst, such as a catalyst containing amide, imidazole, mercaptan, or sulfide group(s). In general, the second cure catalyst may be any epoxy curative group known in the prior art.

In an aspect of the invention, the second cure catalyst may be employed in amounts of about 0.05% to about 8% by weight of the total composition. In another aspect of the invention, the second cure catalyst is present in amounts of 0.1% to about 3% by weight of the total composition.

Optional additives, such as, but not limited to, stabilizers, inhibitors, oxygen scavenging agents, fillers, dyes, colors, pigments, adhesion promoters, plasticizers, toughening agents, reinforcing agents, fluorescing agents, wetting agents, antioxidants, rheology modifying agents, and combinations thereof also may be included in the compositions of the present invention.

In yet other aspect of the invention there is provided a curable, dual-phase composition including a continuous matrix of a first polymer containing domains including: a) a second polymer, wherein the second polymer comprises oxirane groups or oxetane groups in an amount sufficient to allow for further curing of the domains and b) a domain curing co-component.

In aspects of the invention, the cured, dual-phase compositions of the invention and produced from the curable compositions of the present invention exhibit modified shape memory properties as compared to typical RIPS compositions. Typical silicone matrices exhibit a shape memory that may be characterized as thermoset in nature. Essentially, once cured a silicone matrix with maintain its cured shape even in the face of heating and cooling in a alternate shape. Cured RIPS compositions exhibit a shape memory that may be characterized as thermoplastic in nature. If a RIPS composition is heated and cooled in an alternate shape, then the composition will maintain that shape. The cured compositions of the present invention exhibit the thermoset-type properties (e.g., they maintain their shape) at elevated temperatures. In aspects of the present invention, the cured compositions of the present invention exhibit these thermoset-type properties and will not maintain an alternate shape when heated to temperatures up to about 200 C, preferably up to about 250° C., followed by cooling.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

EXAMPLES

Example 1

Curing of Glycidyl Methacrylate Alone

Glycidyl methacrylate (GMA) properties were explored going from the a first (radical) cure to a secondary epoxy cure. The following formulation was prepared:

TABLE 1

| Formulation A | |
|---|---|
| Ingredient | % weight |
| GMA | 96.54 |
| Photoinitiator | 1.66 |
| 1-methylimidazole | 1.8 |

The photoinitiator was 1% Irgacure 891 in Diethoxyacetophenone (DEAP).

The formulation was placed between glass slides to form an with 1 mm gap to form an assembly. The assembly was cured in UV medium pressure chamber (UVA 0.126 w/cm$^2$, UVB 0.143 w/cm$^2$, UVC 0.008 w/cm$^2$, UVV 0.133 w/cm$^2$) for 240 seconds. The assembly was turned over every 60 seconds. The assembly was separated and the cured polymer removed from the slides. A portion of the cured polymer further treated by heating at 90° C. for 3 days.

IR Testing

The samples were analyzed by photospectrometer. The relative degree of cure for the methacrylate portion was calculated using the integrated peak area of the C=C peak (absorbance 1652-1607 cm$^{-1}$). The relative degree of cure for the epoxy portion was calculated using epoxide peak (absorbance 921-890 cm$^{-1}$). the C=O peak (absorbance 1770-1670 cm$^{-1}$) was used as a an internal standard. The relative degree of cure was calculated as follows:

Degree of cure (%)=($A0-A1$)/$A0$×100

It is noted that ratio of the area of the C=C peak to the area of the C=O peak at 100% degree of cure is not known. A0 is the ratio of the area of the C=C peak (the epoxide peak) to the area of the C=O peak of the spectrum of glycidyl methacrylate (uncured) and A1 is the ratio of the area of the same two peaks of the spectra of the submitted samples.

The IR spectra of glycidyl methacrylate samples shows the ratios of the area of the C=C peak and the area of the C=O peak. Relative degree of cure was calculated for the methacrylate portion of the cured samples. As shown in Table 2, The relative degree of acrylate cure was above 93% for both samples. The last column of Table 2 shows the calculated relative degree of cure for the epoxy portion of the submitted cured samples. The relative degree of cure was lower with UV only sample compared to the sample that was also heat cured for 3 days at 90° C.

TABLE 2

| Percent acrylate and epoxy cure for Formulation A. | | |
|---|---|---|
| Sample Cure Conditions | % Acrylate Cure | % Epoxy Cure |
| UV only | 95 | 27 |
| UV and Heat | 93 | 72 |

It is noted that the UV cure sample was inadvertently heated during the UV cure to approximately 70° C. for 30 seconds due to the high intensity/output of the medium pressure mercury lamp.

Thermomechanical Analysis

Thermomechanical Analysis (TMA) was run under the following conditions:
Instrument: Perkin Elmer DMA 7e in TMA (static mode)
Measurement tool: expansion probe
Force load: 2 mN
Purge gas: 20 cc/min helium
Temperature ramp rate: 10° C./min A TMA run from 25° C. to 150° C. was conducted on the sample subjected only to the UV cure. The results showed a softening temperature around 70° C. A second TMA run from 25° C. to 200° C. was conducted on the same sample and the results showed a softening temperature around 160° C. A third TMA run from 150° C. to 300° C. was conducted on the same sample and the results showed no softening temperature. These results indicate that continued crosslinking of the GMA generated a cross link matrix showing no softening point up to 300° C.

Dynamic Mechanical Analysis

Dynamic mechanical analysis (DMA) was run under the following conditions:
Instrument: RSA III
Measurement tool: 3-point bending tool
Temperature ramp rate: 5° C./min
Frequency=1 Hz A DMA run from 0 to 150° C. was conducted on the sample subjected only to the UV cure. The results showed a glass transition temperature ($T_g$) (70° C. by E' onset, 102° C. by peak tan_delta). Second and third DMA runs (0° C. to 150° C.) were conducted on the same sample. The results for both of these runs showed no $T_g$. Similar results were obtained on DMA runs repeated on another sample subjected only to the UV cure.

For the sample subjected to both the UV cure and the heat cure (90° C. for 3 days), a DMA run from 30° C. to 250° C. was conducted. The results showed no $T_g$.

These results confirm that further cross linking of GMA leads to a matrix with no softening up to 250° C.

Differential Scanning Calorimetry Analysis

Differential scanning calorimetry (DSC)analysis was run under the following conditions:
Instrument: Perkin Elmer DSC 8000
Environment: 20 ml/min nitrogen
Sample pan: 30 µl aluminum pan
Temperature ramp: 15° C. to 250° C. or 200° C. at 10° C./min A DSC run from 15° C. to 250° C. was conducted on the sample subjected only to the UV cure. The results showed a $T_g$ at 75° C. and an exothermic peak at 182° C. A second DSC run from 15° C. to 200° C. was conducted on the same sample and the results showed no $T_g$ or reaction peak. Similar results were obtained on another specimen of the sample subjected only to the UV cure.

For the sample subjected to both the UV cure and the heat cure (90° C. for 3 days), a DSC run (15° C. to 200° C.) was conducted. The results show no $T_g$ or reaction peak.

These results confirm the findings from TMA and DMA.

The analysis above confirms that if GMA phase separates from the continuous matrix during cure, then further cross-link via the epoxy functionality can eliminate the softening of the domains.

Example 2

Curing of Glycidyl Methacrylate Alone

The formulations in Table 3 were prepared and cured as described in Example 1, except the heat cure was at 90° C. for the times shown in Table 4.

TABLE 3

Formulations B-E.

| Ingredient | Formulation | | | |
|---|---|---|---|---|
| (% weight) | B | C | D | E |
| GMA | 99 | 99 | 98.5 | 96.54 |
| Photoinitiator | | | | 1.66 |
| 1-methylimidazole | 1 | 1 | 1.5 | 1.8 |

IR Testing

The percent acrylate and epoxy cure were calculated as described in Example 1 and the results shown in Table 4.

TABLE 4

Percent acrylate and epoxy cure for Formulations B-E.

| Formulation (Cure Conditions) | % Acrylate Cure | % Epoxy Cure |
|---|---|---|
| B (Heat only (16 hours)) | 27 | 88 |
| D (Heat only (30 hours)) | 23 | 89 |
| C (UV only) | 94 | 2 |
| E (UV only) | 97 | 3 |
| E (UV and Heat (24 hours)) | 95 | 46 |

The data indicates that the heat cured samples showed some conversion of the methacrylate group even without the benefit of UV cure. However, the epoxy cure does not occur under UV only conditions.

Dynamic Mechanical Analysis

DMA was conducted as follows using the conditions in Example 1.

A DMA run from 30° C. to 200° C. were conducted on the dual cured sample (Formulation E) (between glass slides or thick section). The results showed no transitions.

A DMA run from –50° C. to 200° C. was conducted on the heat cured Formulation B (90° C. for 16 hour). The results showed a $T_g$ (–10° C. by E' onset, 14° C. by peak tan_delta). A second DMA run from –50° C. to 150° C. was conducted on the same sample. The results showed no $T_g$.

A DMA run from 30° C. to 200° C. was conducted on Formulation C (UV cured sample (thick section)). The results showed a $T_g$ (60° C. by E' onset, 85° C. by peak tan_delta) and a melting point ($T_m$) (179° C. by peak tan_delta). The sample flowed at the end of test.

A DMA run from 25° C. to 200° C.) was conducted on Formulation C (UV cured sample (between glass slides)). The results showed a $T_g$ (85° C. by peak tan_delta). A second DMA run from 30° C. to 200° C. was conducted on the same sample. The results showed no $T_g$.

Differential Scanning Calorimetry Analysis

DSC analysis was conducted as follows using the conditions in Example 1.

A DSC run from 15° C. to 200° C. was conducted on the dual cured sample (Formulation E) (between glass slides or thick section). The results showed no transitions.

A DSC runs from –50 to 150° C. were conducted on the two heat cured samples ((Formulations B and D; 90° C. for 16 or 30 hours, respectively). The results showed $T_g$ at –25° C. and –29° C., respectively.

A DSC run from 15° C. to 200° C. was conducted on the UV cured sample (Formulation C (thick section)). The results showed no transitions.

A DSC run from 15° C. to 200° C.) was first conducted on the UV cured sample (Formulation C (between glass slides)). The results showed an exothermic peak at 114° C. A second DSC run 15° C. to 250° C. was conducted on the same sample. The results showed no reaction peak or $T_g$.

The results of the above tests again indicate that dual cure of GMA further increased crosslinking density and formed a thermoset like structure. The $T_g$ of dual cured samples is much higher than that of the samples cured by UV alone or heat only.

Example 3

GMA Domains in a Silicone Matrix

In this example GMA (domain forming component) was incorporated into a silicone matrix (continuous matrix forming component) to investigate phase separation and impact on softening point and thermal degradation of the phase separated domains by further cross linking.

The formulations in Table 5 were prepared by admixing and cured as described in Example 1, except the heat cure was at 90° C. for 18 hours.

TABLE 5

Formulations F-H.

| Ingredient | Formulation | | |
|---|---|---|---|
| (% weight) | F | G | H |
| ACR Di-25 | 70.45 | | 80.43 |
| 12DMA | | 54.82 | |
| GMA | 28.18 | 21.93 | 16.57 |
| UVI | | | 1.54 |
| Photoinitiator | 1.37 | 1.32 | 1.46 |
| IBOA | | 21.93 | |

ACR Di-25 is a 2500 mw polydimethyl siloxane polymer having telechelic, acrylate terminations at each end. 12DMA is a 12,000 mw polydimethyl siloxane polymer having dimethoxy acrylate terminal groups. UVI is a mixture of triarylsulfonium hexafluoroantimonate salts in propylene carbonate. The photoinitiator is 1% Irgacure 819 in DEAP. IBOA is isobronyl acrylate.

IR Testing

The percent acrylate and epoxy cure were calculated as described in Example 1 and the results shown in Table 6.

TABLE 6

Percent acrylate and epoxy cure for Formulation F.

| Formulation (Cure Conditions) | % Acrylate Cure | % Epoxy Cure |
|---|---|---|
| F (UV only) | 98 | 27 |
| F (UV and Heat) | 97 | 50 |

For the methacrylate cure, the relative degree of cure was above 97% for both samples. For the epoxy cure, the relative degree of cure was lower with UV only sample (27%) compared to the sample that was also heat cured (50%). Note that there was some inadvertent heating of the UV only cure sample due to the intensity of the light source.

Dynamic Mechanical Analysis

DMA was conducted as follows using the conditions in Example 1.

A DMA run from −120° C. to 200° C. was conducted on a Formulation F (UV cure only) sample. Two glass transitions were detected. This indicates phase separation, i.e., −103° C. $T_g$ for the silicone phase and 92° C. $T_g$ for the GMA phase.

All other DMA runs were conducted from 40 to 200° C. to measure $T_g$ of the GMA phase. For all three formulations, the dual cured sample showed a higher $T_g$ (by tan_delta peak) than the UV cured one. For the same sample, $T_g$ increased from the first run to the second run. The increase was more significant for the UV cured samples than for the dual cured samples. (See Table 7.) These results indicate that heat cure following UV cure increases the $T_g$ of the GMA domains in the dual phase cured

TABLE 7

$T_g$ for Formulations F-H.

| Formulation | Cure Conditions | $T_g$ (by tan_delta peak) | |
|---|---|---|---|
| | | Run 1 | Run 2 |
| F | UV only | 92 | 100 |
| F | UV and Heat | 100 | 100 |
| G | UV only | 111 | 116 |
| G | UV and Heat | 116 | 117 |
| H | UV only | 83 | 91 |
| H | UV and Heat | 93 | 98 |

Thermogravimetric Analysis

Thermogravimetric analysis was conducted on Formulations G-I under the following conditions:

Instrument: TA Discovery TGA

Environment: 25 ml/min nitrogen

Temperature program: equilibrate to 50° C., then 50 to 700° C. at 20° C./min

Figure 2:
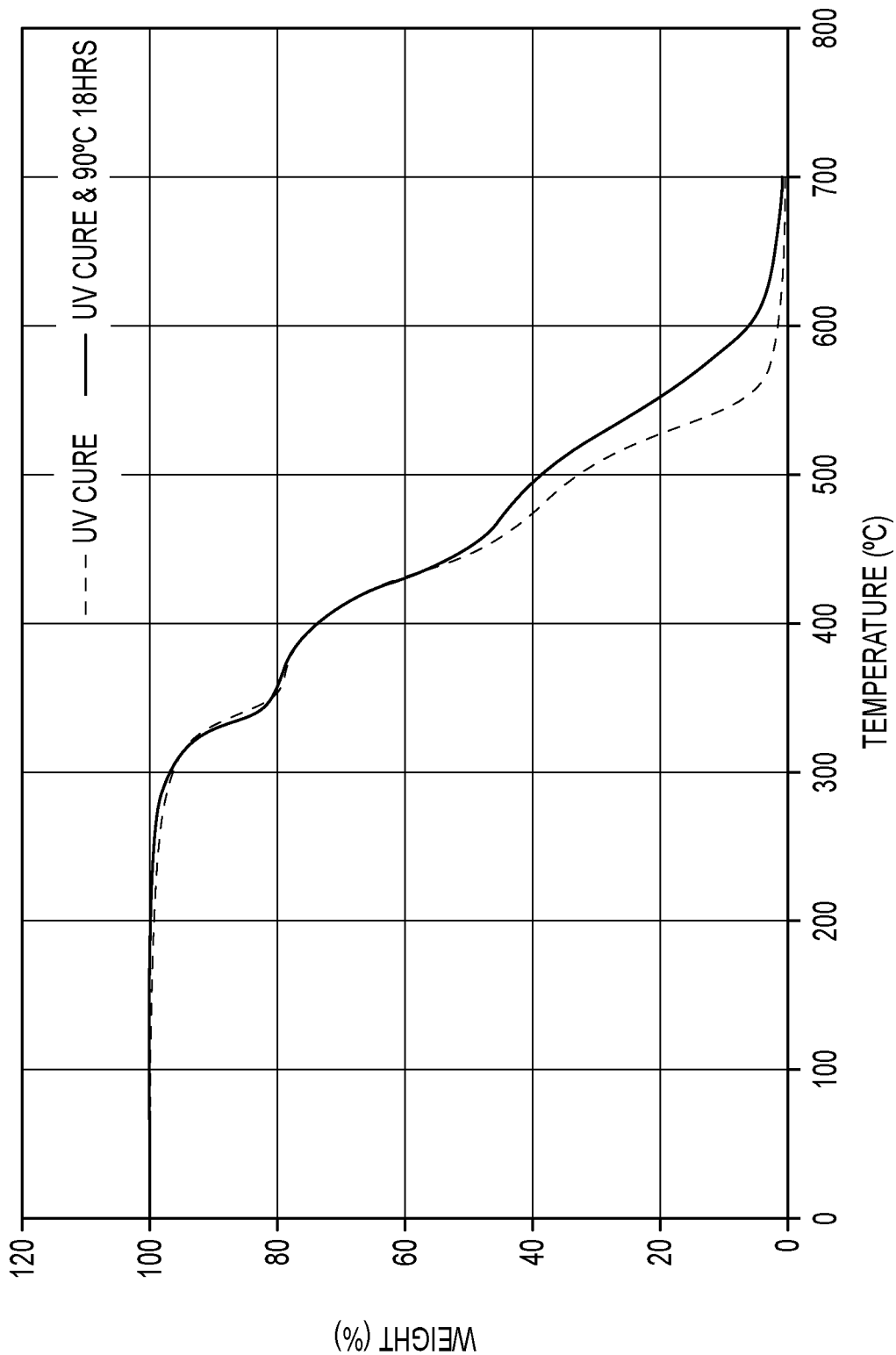
FIG. 2 shows thermogravimetric analysis curve for Formulation G.
Figure 3:
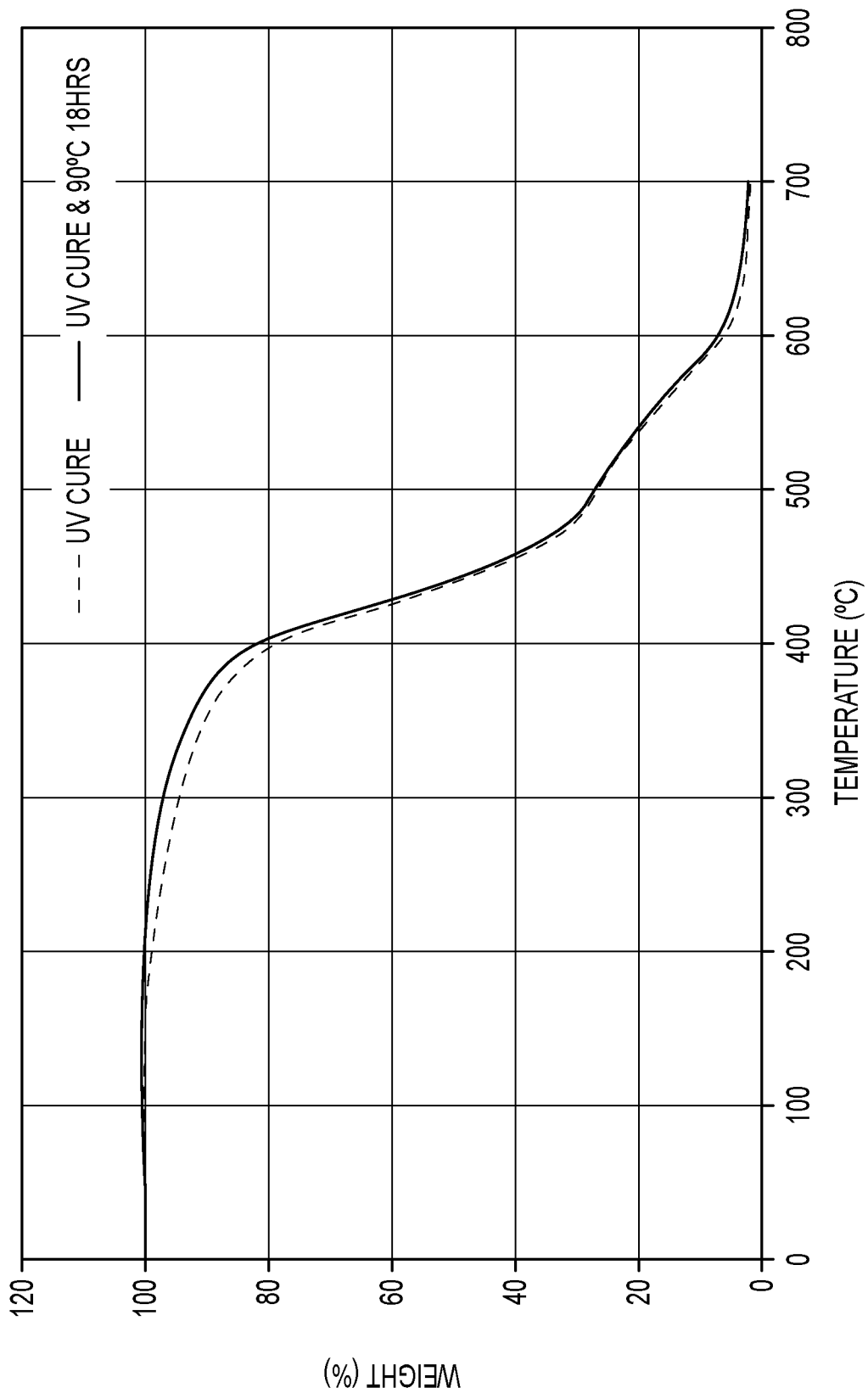
FIG. 3 shows thermogravimetric analysis curve for Formulation H.

The TGA curves for Formulations F-H are shown in FIGS. 1-3, respectively. All three TGA curves indicate that the post heat cure increases the stability of the cured matrix with regard to thermal degradation.

Example 4

GMA Domains in a Silicone Matrix

In this example GMA domain component was incorporated into a silicone matrix with and without the domain forming co-component acrylic acid to investigate the impact on softening point of the phase separated domains by further cross linking.

The formulations in Table 8 were prepared by admixing and cured by exposure to an H bulb (mercury lamp) for 60 seconds followed by exposure to an LED lamp at 375 nm for 90 seconds. Samples of each formulation were then heat cured for 30 minutes at 150° C.

TABLE 8

Formulations I-L.

| Ingredient (% weight) | Formulation | | | |
|---|---|---|---|---|
| | I | J | K | L |
| 12DMA | 98.98 | 89 | 89 | 87.68 |
| GMA | | 10 | | 9.28 |
| Acrylic Acid | | | 10 | 2.11 |
| Photoinitiator | 1.02 | 1 | 1 | 0.93 |

The photoinitiator is 1% Irgacure 819 in DEAP.

Dynamic Mechanical Analysis

A DMA run from −80° C. to 200° C. was conducted on a each a sample of each formulation for UV only cure and UV and Light cure. The detected glass transition temperatures for each sample are reported in Table 9.

TABLE 9

$T_g$ for Formulations I-L.

| Formulation | Cure Conditions | $T_g$ (° C.) (by tan_delta peak) | |
|---|---|---|---|
| | | Si Phase | GMA Phase |
| I | UV only | −40 | n/a |
| I | UV and Heat | −40 | n/a |
| J | UV only | −35 | 105 |
| J | UV and Heat | −35 | 105 |
| K | UV only | −35 | 125 |
| K | UV and Heat | −35 | 125 |
| L | UV only | −35 | None |
| L | UV and Heat | −35 | None |

For Formulation I there was no GMA phase $T_g$ for either sample as was expected given the absence of GMA in the formulation. For Formulation J there was a GMA phase $T_g$ at 105° C. for both samples. This indicated that the application of heat failed to produce a secondary cure of the GMA domains. For Formulation K, despite the absence of GMA, there was a GMA phase $T_g$ at 125° C. for both samples. This indicated that the acrylic acid appears to be light curing to produce domains. For Formulation L there was no GMA phase $T_g$ for either sample. This indicated that there was no phase separation to be detected. Formulation L showed the softening of the phase separated GMA which did not change on further heating indicating no change to the phase separated domain. Formulation K showed the softening of the phase separated polymerized acrylic acid. The heat treatment may have impacted on the cross link of the domain via carboxylic reactions leading to a smaller $T_g$ plot and shift of the softening point to a slightly higher temperature. Formulation L shows a slight softening point which disappeared on further heating. It is possible that the close proximity in the phase separated domain and heat generated during UV cure may have initiated a small degree of crosslinking.

Tensile Properties

The tensile properties of Formulations I-L were tested using the method of STM-708 with a die cut (Die C dogbone) from the cured film. The testing was conducted at room temperature and at 130° C. The results are shown in Table 10.

TABLE 10

Tensile Properties for Formulations I-L.

| Formulation | Stress at Break (psi) | | Elongation at Break (%) | |
|---|---|---|---|---|
| | RT | 130° C. | RT | 130° C. |
| I | 61 | 29 | 87 | 42 |
| J | 43 | 19 | 63 | 48 |
| K | 71 | 39 | 67 | 60 |
| L | 51 | 48 | 53 | 59 |

The percent change from room temperature to 130° C. is reported in Table 11.

TABLE 11

Change in Tensile Properties for Formulations I-L.

| | % Change Room Temperature to 130° C. | |
|---|---|---|
| Formulation | Stress at Break | Elongation at Break |
| I | −52 | −52 |
| J | −56 | −23 |
| K | −45 | −10 |
| L | −6 | 11 |

In sum, Formulation L (with 12DMA, GMA, and AA) showed marked improvements in tensile properties at elevated temperatures as compared to the other formulations missing GMA, AA, or both. Thus, the toughened properties provided by the GMA domains to the cured composition at room temperature are maintained at elevated temperatures by the secondary epoxy cure of the GMA domains.

Thermogravimetric Analysis

Thermogravimetric analysis was conducted on Formulations I, J, and L under the following conditions:
Instrument: TA Discovery TGA
Environment: 25 ml/min nitrogen
Temperature program: equilibrate to 50° C., then 50 to 200° C. at 10° C./min The % weight loss for each sample tested is reported in Table 12.

TABLE 12

Degradation of Formulations I, J, and L % weight loss.

| | % Weight Loss | |
|---|---|---|
| Formulation | Light only | Light and Heat |
| I | 3.4 | 2.3 |
| J | 8.3 | 7.5 |
| L | 4.4 | 3.7 |

Formulation I (with no GMA) has a degradation in the 2-3% range for both cure systems. Formulation J (GMA, but no acrylic acid) shows a degradation over twice that of Formulation J, indicating that the GMA is degrading in addition to the silicone. Formulation L (with both GMA and AA) shows a degradation of 3-4%, which is very close that of the Formulation I. This indicates that the degradation of Formulation L is primaryl due to the degradation of the silicone phase and that the GMA phase is largely immune to degradation. This is likely due to the additional crosslinking of the domains through the epoxy cure. Thus, the secondary cure improves the thermal degradation properties of the cured dual phase compostion.

Example 5

GMA and Isobornyl Acrylate (IBOA) Mix Domains in a Silicone Matrix

In this example a mixture of GMA and IBOA was incorporated into a silicone matrix with and without the domain forming co-component acrylic acid to investigate the impact on softening point of the phase separated domains by further cross linking.

The formulations in Table 13 were prepared by admixing and cured by exposure to an H bulb (mercury lamp) for 60 seconds followed by exposure to an LED lamp at 375 nm for 90 seconds. Samples of each formulation were then heat cured for 30 minutes at 150° C.

TABLE 13

Formulations M and N.

| Ingredient | Formulation | |
|---|---|---|
| (% weight) | M | N |
| 12DMA | 64.94 | 64.94 |
| IBOA | 22.73 | 22.73 |
| GMA | 11.36 | 9.09 |
| Acrylic Acid | | 2.27 |
| Photoinitiator | 0.97 | 0.97 |

The photoinitiator is 1% Irgacure 819 in DEAP.

Dynamic Mechanical Analysis

A DMA run from −80° C. to 200° C. was conducted on a each a sample of each formulation for UV only cure and UV and light cure. The detected glass transition temperatures for each sample are reported in Table 14.

TABLE 14

$T_g$ for Formulations M and N.

| | Cure | $T_g$ (° C.) (by tan_delta peak) | |
|---|---|---|---|
| Formulation | Conditions | Si Phase | GMA Phase |
| M | UV only | −35 | 120 |
| M | UV and Heat | −35 | 120 |
| N | UV only | −35 | 120 |
| N | UV and Heat | −35 | None |

For Formulation M (with no AA) there was a GMA phase $T_g$ at 120° C. for both samples. This indicated that the application of heat failed to produce a secondary cure of the GMA domains. For Formulation N there was a GMA phase $T_g$ at 120° C. for the light cured sample and no GMA phase $T_g$ for the light and heat cured sample. This indicated that the presence of acrylic acid aids in the secondary epoxy cure of the GMA domains and eliminates the softening typically associated with GMA. It also demonstrates that only a small amount of GMA is required to provide improved softening properties to the cured composition.

Example 6

GMA Domains in a Hybrid Silicone Matrix

In this example GMA was incorporated into a hybrid silicone matrix with and without the domain forming co-component acrylic acid to investigate the impact on softening point of the phase separated domains by further cross linking.

The formulations in Table 15 were prepared by admixing and cured by exposure to an H bulb (mercury lamp) for 60 seconds followed by exposure to an LED lamp at 375 nm for 90 seconds.

Samples of each formulation were then heat cured for 30 minutes at 150° C.

TABLE 15

Formulations O-Q.

| Ingredient (% weight) | Formulation | | |
|---|---|---|---|
| | O | P | Q |
| Hybrid Silicone Polymer | 68.67 | 74 | 74 |
| 12DMA | | 0.16 | 0.16 |
| GMA | 22.93 | 25 | 19 |
| Acrylic Acid | 7.67 | | 6 |
| Photoinitiator | 0.73 | 0.84 | 0.84 |

The Hybrid Silicone Polymer is prepared by endcapping a 1,600 MW silicone carbinol polymer (KF6002 polymer from Shin-Etsu Chemicals Company (Tokyo Japan)) with 2-isocyanatoethylacrylate. The photoinitiator is 1% Irgacure 819 in DEAP.

Dynamic Mechanical Analysis

A DMA run from −80° C. to 200° C. was conducted on a each a sample of each formulation for UV only cure and UV and Light cure. The detected glass transition temperatures for each sample are reported in Table 16.

TABLE 16

$T_g$ for Formulations O-Q.

| Formulation | Cure Conditions | $T_g$ (° C.) (by tan_delta peak) | |
|---|---|---|---|
| | | Si Phase | GMA Phase |
| O | UV only | −70 | 85 |
| O | UV and Heat | −75 | None |
| P | UV only | Below −80 | 100 |
| P | UV and Heat | Below −80 | 100 |
| Q | UV only | Below −80 | 100 |
| Q | UV and Heat | Below −80 | None |

For Formulation O there was a GMA phase $T_g$ at 85° C. for the light cured sample and no GMA phase $T_g$ for the light and heat cured sample. This indicated that the presence of acrylic acid aids in the secondary epoxy cure of the GMA domains and eliminates the softening typically associated with GMA. For Formulation P (with no AA) there was a GMA phase $T_g$ at 100° C. for both samples. This indicated that the application of heat failed to produce a secondary cure of the GMA domains. For Formulation Q there was a GMA phase $T_g$ at 100° C. for the light cured sample and no GMA phase $T_g$ for the light and heat cured sample. This indicated that the presence of acrylic acid aids in the secondary epoxy cure of the GMA domains and eliminates the softening typically associated with GMA.

In sum, this experiment demonstrates that the dual cure system of the invention is also applicable to a hybrid silicone resin continuous phase and will produce the improvements in softening properties. This experiment indicates that phase separation will occur in a system that is not totally silicone (e.g., has some organic character) in the continuous phase.

Example 7

GMA Domains in a n-Butyl Acrylate Matrix

In this example GMA was incorporated into an n-butyl acrylate matrix with and without the domain forming co-component acrylic acid to investigate the impact on softening point of the phase separated domains by further cross linking in an organic continuous phase.

The formulations in Table 15 were prepared by admixing and cured by exposure to an H bulb (mercury lamp) for 60 seconds followed by exposure to an LED lamp at 375 nm for 90 seconds. Samples of each formulation were then heat cured for 30 minutes at 150° C.

TABLE 17

Formulations R-T.

| Ingredient (% weight) | Formulation | | |
|---|---|---|---|
| | R | S | T |
| n-Butyl Acrylate | 59.58 | 89.09 | 59.19 |
| GMA | 39.33 | | 31.61 |
| Acrylic Acid | | 9.94 | 8.12 |
| Photoinitiator | 1.09 | 0.97 | 1.08 |

The n-butyl acrylate (continuous matrix forming component)is an acryloyl terminated poly n-butyl acrylate polymer with a MW of about 14,000 (RC110C from Kaneka Corporation (Tokyo Japan)). The photoinitiator is 1% Irgacure 819 in DEAP.

Dynamic Mechanical Analysis

A DMA run from −80° C. to 200° C. was conducted on a each a sample of each formulation for UV only cure and UV and Light cure. The detected glass transition temperatures for each sample are reported in Table 18.

TABLE 18

$T_g$ for Formulations R-T.

| Formulation | Cure Conditions | $T_g$ (° C.) (by tan_delta peak) | |
|---|---|---|---|
| | | Si Phase | GMA Phase |
| R | UV only | −50 | 110 |
| R | UV and Heat | −50 | 110 |
| S | UV only | −35 | None |
| S | UV and Heat | −35 | None |
| T | UV only | −30 | 80 |
| T | UV and Heat | −30 | None |

For Formulation R there was a GMA phase $T_g$ at 110° C. for both samples. This indicated that the application of heat failed to produce a secondary cure of the GMA domains. For Formulation S (with no GMA) there was a no GMA phase $T_g$. Formulation T is showing a $T_g$ at about 80° C. after UV cure, which becomes less pronounced after the heat cure. This indicated that phase separations is observed in a system that is fully organic, i.e., no silicone component, and secondary cure leads to disappearance of the observed $T_g$.

Example 8

Shape Memory

As noted above, the cured, dual-phase compositions of the invention and produced from the curable compositions of the present invention exhibit modified shape memory properties as compared to typical RIPS compositions.

Figure 4:
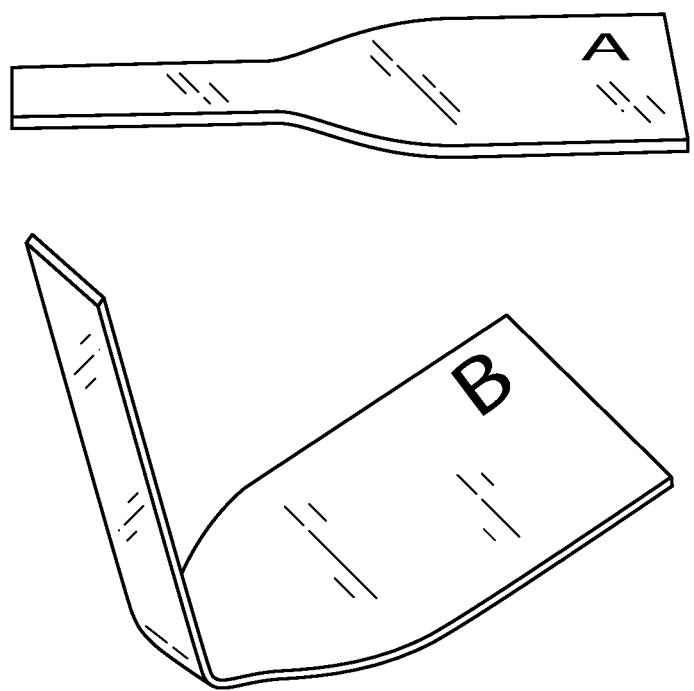
FIG. 4 is a photograph showing the shape memory properties of 2 comparative compositions.
Figure 5:
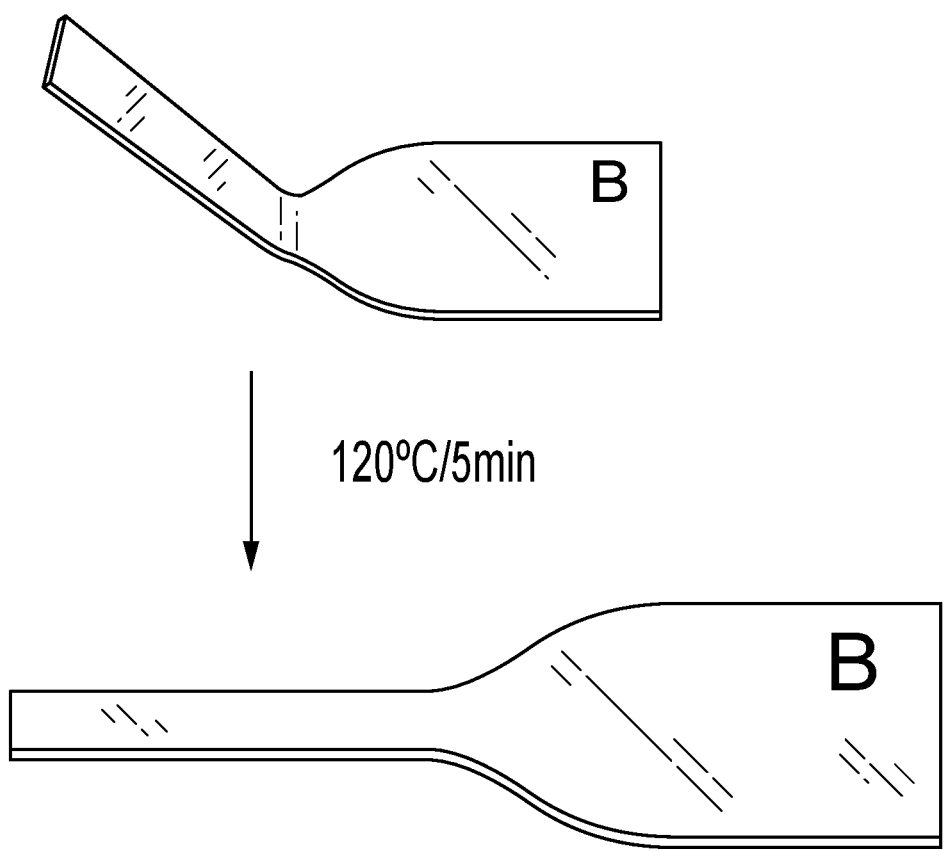
FIG. 5 is a photograph showing the shape memory properties of a comparative composition.

A typical silicone matrix was prepared using 28,000 MW acrylate terminated silicone polymer (marked A in FIGS. 4 and 5). In addition, a RIPS composition was prepared using the same 28,000 MW acrylate terminated silicone polymer as the continuous phase and 40% IBOA to produce the domains (marked B in the FIGS. 4 and 5). Both were cured using 1% Irgacure 819 in DEAP as a photoinitiator and a light cure by irradiation with D bulb medium pressure mercury bulb for 60 seconds.

A sample of each of the above was placed in an oven at 120° C. for 30 minutes while bent 90° and held in bent shape during cooling to room temperature. After cooling to room temperature the bending force was removed.

As shown in FIG. 4, the typical silicone matrix (A) immediately opened to its original flat shape, while the RIPS composition (B) maintained the bent shape.

The RIPS composition (B) was then placed in the oven at 120° C. for 5 minutes. As shown in FIG. 5, the sample opened to the flat shape of its original cure.

Figure 6:
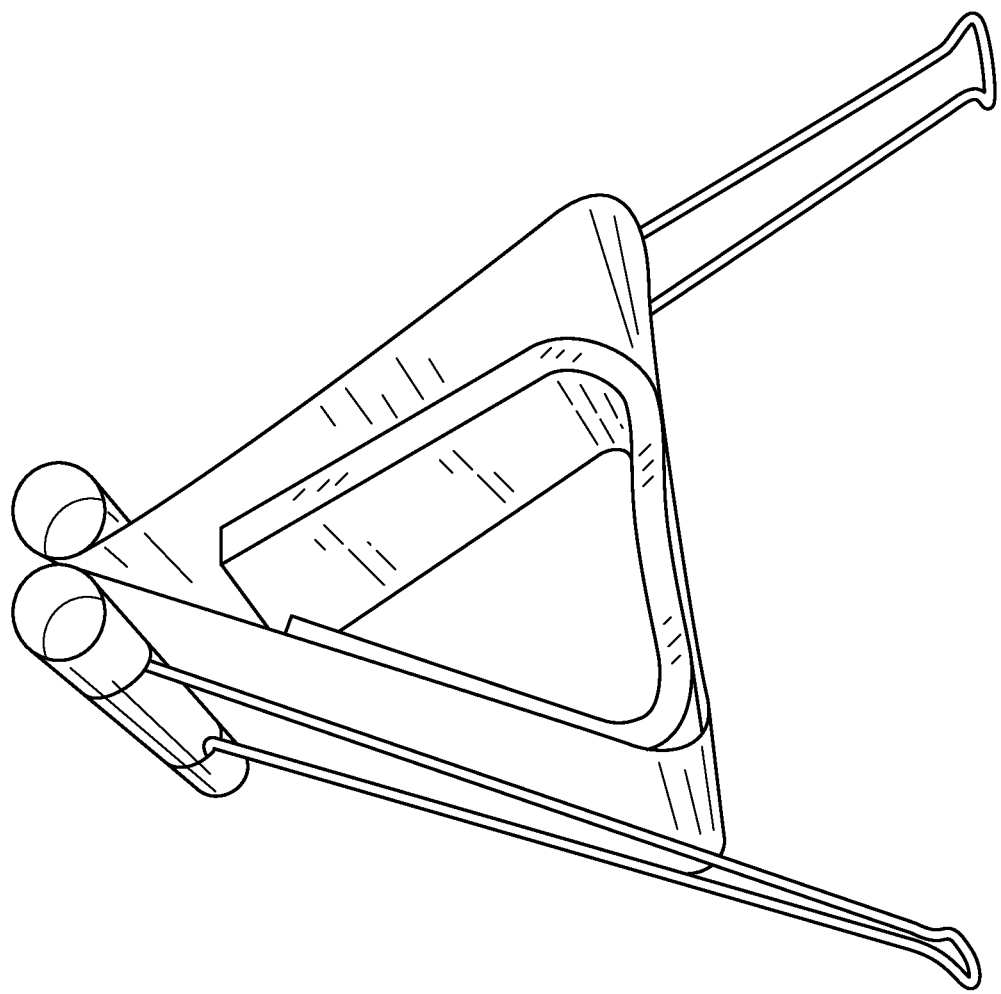
FIG. 6 is a photograph showing the shape memory properties of a composition of the present invention.

A flat half dog-bone shaped sample of Formulation L (cured both with light and heat) was placed in a clamp to maintain a closed shape. (FIG. 6). The clamped sample was placed in oven at 120° C. for 30 minutes. The sample was them cooled to room temperature in the clamped shape.

Figure 7:
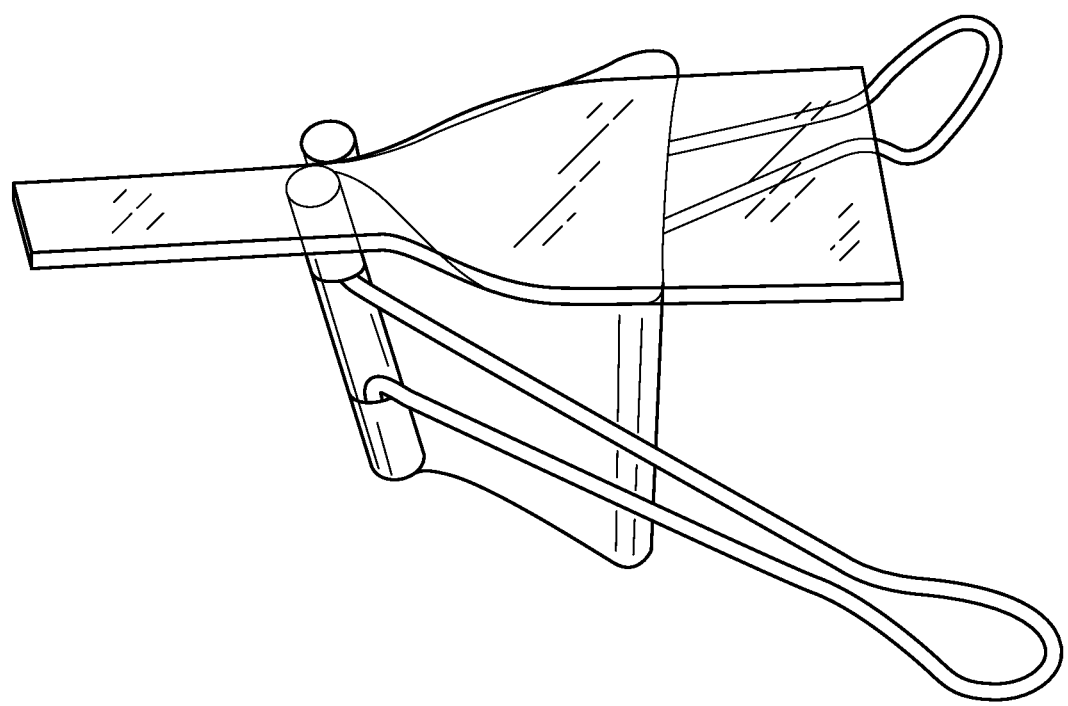
FIG. 7 is a photograph showing the shape memory properties of a composition of the present invention.

When the clamp was opened, the sample immediately opened to the shape of its initial cure and did not maintain the geometry of the entrapped shape in the clamp. (FIG. 7.)

Figure 8:
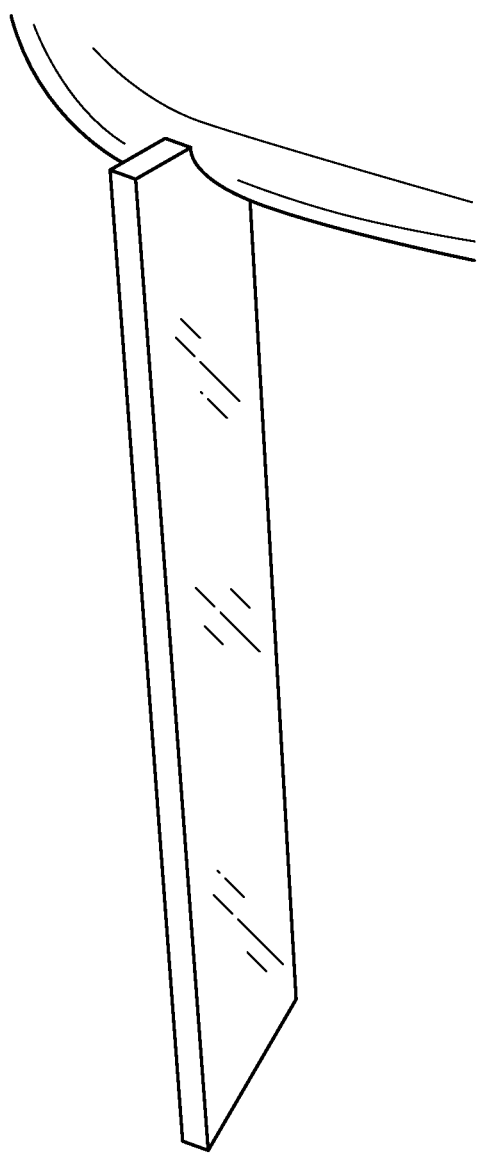
FIG. 8 is a photograph showing the shape memory properties of a composition of the present invention.
Figure 9:
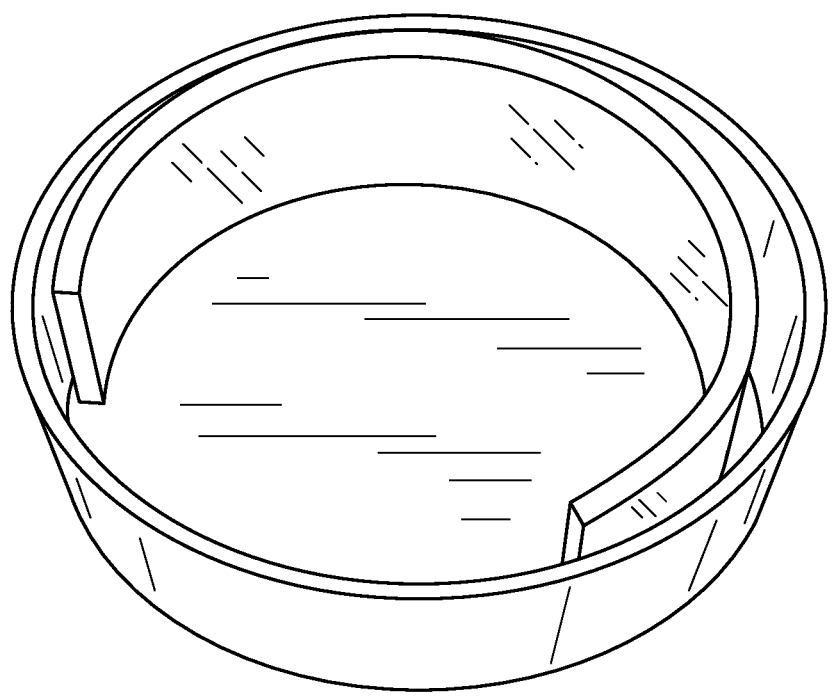
FIG. 9 is a photograph showing the shape memory properties of a composition of the present invention.
Figure 10:
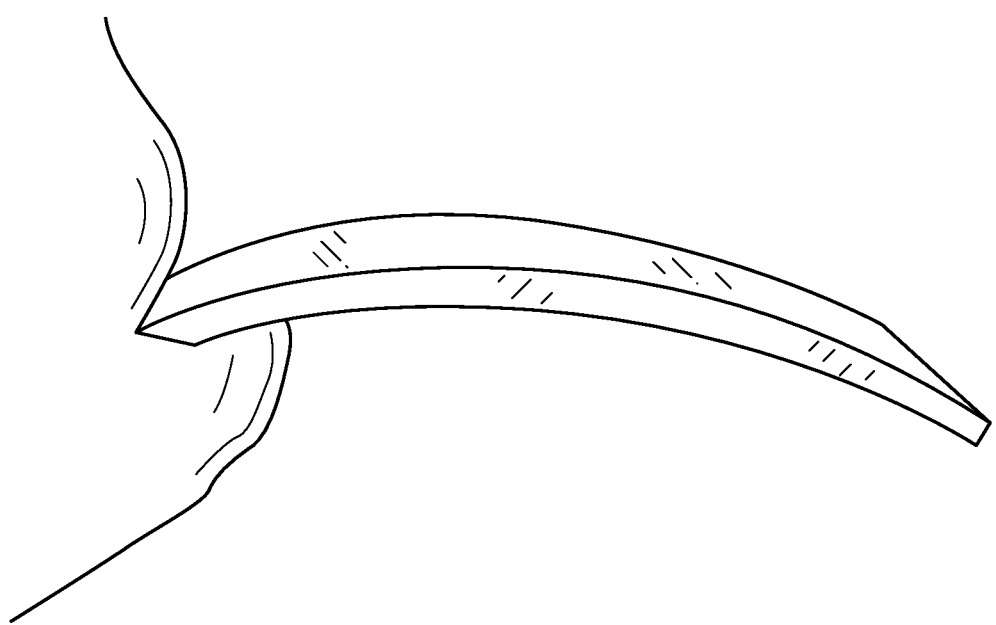
FIG. 10 is a photograph showing the shape memory properties of a composition of the present invention.
Figure 11:
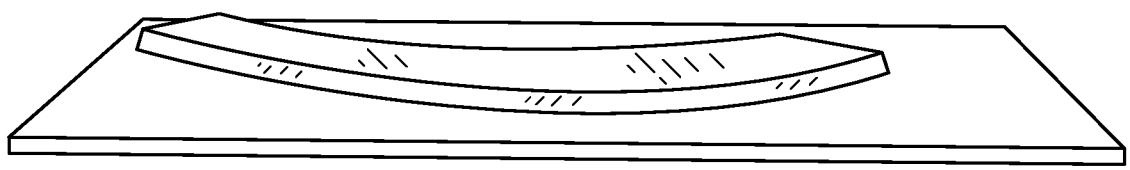
FIG. 11 is a photograph showing the shape memory properties of a composition of the present invention.

A sample of Formulation L was UV cured as set forth above in a flat shape (FIG. 8). As shown in FIG. 9, this UV cured sample was then placed in a plastic bowl to maintain a curved shape and heat cured as discussed above. Upon removal of the sample from the bowl it maintains the curved shape. (FIG. 10.) When placed on a glass slide and heated to 150 C, the sample did not flatten, but instead maintained the bent shape. (FIG. 11.) Thus, the thermoset-type properties of the inventive compositions are a result of the additional crosslinking of the domains caused by the secondary heat cure.

In sum, the cured compositions of the present invention exhibit thermoset-type properties at elevated temperatures after both UV and heat curing and will not maintain an alternate shape upon heating and cooling. Thus, the cure compositions of the present invention have a modified shape memory that differs from both a typical silicone matrix and a cured RIPS composition.

The invention claimed is:

1. A curable composition comprising a mixture of:
   a) a continuous matrix forming component comprising at least two acrylate moieties and having a molecular weight of about 500 daltons or greater,
   b) a domain forming component having the formula:

MA-R-Z wherein MA is a (meth)acrylate, R is a $C_{1-8}$ alkylene, and Z is an oxirane group or an oxetane group, and
   c) a domain forming co-component;
   wherein the curable composition can undergo reaction induced phase separation to produce domains of a polymer of the domain forming component within a continuous matrix of a polymer of the continuous matrix forming component upon exposure to a first set of curing conditions that promotes curing of the acrylate moieties.

2. The curable composition of claim 1, wherein the continuous matrix forming component is selected from the group consisting of silicones, polyacrylates, polyisobutylenes, polyethers, hydrogenated polybutadienes, polyesters, and combinations thereof.

3. The curable composition of claim 1, wherein the continuous matrix forming component is a diemethoxy endcapped polydimethyl siloxane.

4. The curable composition of claim 1, wherein the continuous matrix forming component is present in the curable composition in an amount of about 40% to about 95% by weight based on the total weight of the curable composition; and/or the domain forming component is present in the curable composition in an amount of about 5% to about 60% by weight based on the total weight of the curable composition.

5. The curable composition of claim 1, wherein the continuous matrix forming monomer is present in the curable composition in an amount of about 55% to about 75% by weight based on the total weight of the curable composition; and/or the domain forming component is present in the curable composition in an amount of about 25% to about 45% by weight based on the total weight of the curable composition.

6. The curable composition of claim 1, wherein the domain forming component is glycidyl methacrylate.

7. The curable composition of claim 1, wherein the domain forming co-component is selected from the group consisting of organic acids, an organic primary amines, organic secondary amines, amides, imidazoles, mercaptans, sulfides, and combinations thereof.

8. The curable composition of claim 1, wherein the domain forming co-component is a carboxylic acid.

9. The curable composition of claim 1, wherein the domain forming co-component is acrylic acid.

10. The curable composition of claim 1, wherein the ratio of the domain forming co-component and the domain forming component is a ratio between about 1:99 and about 1:1.

11. The curable composition of claim 1, further comprising a first cure catalyst.

12. The curable composition of claim 11, wherein the first cure catalyst is a photoinitiator.

13. The curable composition of claim 11, wherein the first cure catalyst is present in the curable composition in an amount of about 0.05% to about 8% by weight based on the total weight of the curable composition.

14. The curable composition of claim 1, wherein the first set of curing conditions comprises exposure to light.

15. The curable composition of claim 1, wherein the combination of the domain forming component and the domain forming co-component is curable via an epoxy cure reaction and a second set of curing conditions promotes the epoxy cure reaction.

16. The curable composition of claim 15, wherein the second set of curing conditions comprises heat.

17. A method of producing a dual-phase, cured composition comprising:
   a) providing a curable composition comprising a mixture of:
      i) a continuous matrix forming component comprising at least two acrylate moieties and having a molecular weight of about 500 daltons or greater,
      ii) a domain forming component having the formula:

MA-R-Z wherein MA is a (meth)acrylate, R is a $C_{1-8}$ alkylene, and Z is an oxirane group or an oxetane group, and
      iii) a domain forming co-component;

b) exposing the curable composition to a first set of curing conditions to induce reaction induced phase separation to produce an intermediate cured composition having domains of a polymer of the domain forming component within a continuous matrix of a polymer of the continuous matrix forming component, c) exposing the intermediate cured composition to a second set of curing conditions to induce additional curing of the domains of the polymer of the domain forming component to obtain a dual-phase, cured composition.

18. A dual-phase, cured composition produced by the method of claim 17.

* * * * *